United States Patent [19]

Beste et al.

[11] 3,718,584

[45] Feb. 27, 1973

[54] COLLOIDAL METAL OXIDE SOLS IN POLAR ORGANIC SOLVENTS

[75] Inventors: Lawrence F. Beste, Wilmington, Del.; Edward B. Jones, Waynesboro, Va.; Paul C. Yates, Wilmington, Del.

[73] Assignee: E. I. du Pont de Nemours and Company, Wilmington, Del.

[22] Filed: Nov. 30, 1970

[21] Appl. No.: 93,861

[52] U.S. Cl..................252/8.1, 252/309, 260/41 B, 260/DIG. 24
[51] Int. Cl............C09d 5/18, C09k 3/28, B27k 3/16
[58] Field of Search..............................252/8.1, 309

[56] References Cited

UNITED STATES PATENTS

| 3,553,132 | 1/1971 | Dunay et al. | 252/8.1 |
| 3,440,259 | 4/1969 | Bungs | 252/8.1 |
| 3,437,591 | 4/1969 | Bungs | 252/8.1 |
| 3,211,768 | 10/1965 | Considine | 252/8.1 |
| 2,461,302 | 2/1949 | Trular et al. | 252/8.1 |
| 2,416,447 | 2/1947 | Laughlin et al. | 252/8.1 |
| 2,570,566 | 10/1951 | Lang et al. | 252/8.1 |
| 2,669,521 | 2/1954 | Bierly | 252/8.1 |

*Primary Examiner*—George F. Lesmes
*Assistant Examiner*—J. P. Brammer
*Attorney*—Don M. Kerr

[57] ABSTRACT

Sols of $Sb_2O_3$, $SnO_2$ and $TiO_2$ in organic polar liquids are prepared by reacting a soluble salt of the metal with water and ammonia in a solution in the liquid. The reaction produces the metal oxide in colloidal dispersion and an insoluble ammonium salt, which precipitates and is filtered off. Sols in liquids which are solvents for organic polymers are used to incorporate metal oxides into the polymers and polymeric articles such as fibers and films to provide flame resistance.

9 Claims, No Drawings

3,718,584

COLLOIDAL METAL OXIDE SOLS IN POLAR ORGANIC SOLVENTS

BACKGROUND OF THE INVENTION

Objectives of Adding Metal Oxides to Organic Polymers

Attempts have been made to incorporate metallic oxides such as the oxides of antimony, tin and titanium, into organic polymers both natural and synthetic, to improve a number of their properties. For example, these oxides have been used to improve the resistance to burning, particularly when employed in conjunction with organic halogen compounds. In other instances, screening out ultraviolet light by the oxide has been sought. Oxides of this class have been employed as delustering and weighting agents for artificial silk, nylon and other materials. They have also been used to insolubilize films such as cellulose, starch, and polyvinyl alcohol against the action of boiling water, as well as for other purposes.

Prior Art Approaches for Addition of Oxides to Polymers

A variety of techniques have been employed to introduce the metal oxides into organic polymers. For example, ground oxide particles prepared by milling calcined oxides have been suspended in spinning solutions, molding solutions, or polymers melts, to incorporate the oxide in the resulting film, fiber, or molded body. Oxides have been applied as surface coatings along with a resinuous binder as dispersions or suspensions of the oxide in the resinous binder vehicle or solvent. Other procedures have involved dissolving a soluble salt or other metal compound in the spinning solution, molding solution, or polymer melt, and hydrolyzing to the oxide by a reaction in situ within the film or fiber, usually with an aqueous solution or steam.

Other approaches have involved impregnating or dyeing a soluble metal compound into a swollen polymer, followed by hydrolysis of this to the oxide. A variant of this has involved impregnating or dyeing a soluble compound of the metal into a swollen fiber or film, followed by a reaction with a second bath containing a precipitant for the compound. Precipitants used have been silicates, phosphates, carbonates, tungstates, stannates, oxalates, and the like. Metal atoms have been incorporated by dissolving a soluble compound in a spinning solution, molding solution, or melt and maintaining in this form without further hydrolysis or reaction. For example, metal halides such as stannic tetrachloride or antimony trichloride have been added to polymer systems in this manner. Finally, efforts have been made to incorporate metal oxides in the form of finely divided aggregates or powders or dried gels by mixing them in a spinning solution, a molding solution, or a polymer melt.

Although worthwhile objectives have been attained with most of these procedures, each is subject to a number of deficiencies, both in terms of processing problems and in terms of the characteristics of the products obtained.

Deficiencies of Prior Art Approaches
1. Addition of Ground Oxides

The process of mixing relatively coarse oxides prepared by grinding into the spinning solution, molding solution, or polymer melt usually results in severe delustering of the polymer due to the scattering of light from these large particles which have a high refractive index relative to that of the organic polymer.

The large particle size, coupled with the refractory nature of this group of oxides results in a low chemical reactivity, except for the surface atoms which constitute only a small portion of the total. Thus, chemical reactions of these oxides, for example with halides from organohalides, proceed slowly, and such oxides are not efficient flame-proofing agents.

Fibers or films filled with coarse particles suffer impaired mechanical properties. In the case of fibers, the cross-sectional area of the particles may approach the diameter of the fibers themselves, and the bonding between the organic polymer and the inorganic material is often susceptible to rupture via water adsorption at the interface.

Finally, this technique results in major processing difficulties, such as the pluggage of spinnerettes and filter packs and breakage of filaments due to mechanical weakness. Overall result of these problems has been that this approach has been used primarily to prepare molded bodies.

Where this technique has been applied to films or fibers, loadings have had to be high due to the poor efficiency in flameproofing. Uses in such films or fibers have been restricted to applications where aesthetic considerations and mechanical properties were secondary to flame resistance.

2. Surface Coating with Ground Oxides Plus a Binder

The technique of coating the surface of a film or fiber with a binder plus the metal oxide in a suspended, but large particle size form, has similar problems to those of incorporating such oxides directly into the polymer. Again, delustering is virtually complete.

Fibers or films treated in this manner have a stiff and harsh hand, poor flexibility and low tear strength. Because of the large size of the oxide particles, they are not efficient as flameproofing agents, and high loadings, of the order of 20 to even 50 percent, have had to be employed. This approach also has processing difficulties associated with it, since it is necessary to apply the surface coating in a separate step, requiring additional treating baths, drying facilities, etc.

Finally, since the oxides are bonded onto the surface, they are attacked by solvents, and have poor permanency. This is particularly true for fabrics which must be washed in home or industrial laundering equipment, where the combination of vigorous agitation, alkaline solutions and elevated temperatures results in rapid loss of flameproofing properties.

3. Addition of Soluble Compounds + Hydrolysis

Recognizing the difficulties attendant on the first two processes, the art shifted toward a third procedure of dissolving a soluble salt or other compound in the spinning solution, molding solution, or melt and hydrolyzing to the oxide by a subsequent reaction with water or with steam. Although this procedure sometimes led to the formation of some small oxide particles, the process was difficult to control and has poor reproducibility. Conducting a complex chemical reaction within the interstices of a swollen fiber or film requires that diffusion rates, reaction temperatures, pH and many other variables be closely controlled. Even with the utmost control, it is still difficult to obtain a homogeneous and uniform dispersion of oxide particles in this manner. For example, in large pores, there will be a larger amount of the hydrolyzable salt to react and form a relatively coarse oxide particle or aggregate. In smaller pores, the oxide particles or aggregate will be proportionally smaller. Homogeneity is also difficult to obtain since the innermost portions of the fiber or film are not available to the same degree as are outer portions to the diffusion inward of $H_2O$ or steam, or the diffusion out, of the hydrolysis by-products. Thus, though by very careful control it is sometimes possible to obtain a relatively clear and nondelustered film or fiber by this process, the majority of such materials are usually delustered. This process in inherently not applicable to materials of very thick cross-sections, such as relatively thick films or fibers.

By-products of such reactions are often corrosive to equipment, injurious to the polymer by tenderizing or hydrolyzing, and they create pollution problems.

This approach is poorly suited to melt spinning, molding, or casting from polymer melts due to the high viscosity of such melts and the resulting slow reaction times with a hydrolyzing agent.

To the degree that aggregation and large particle size results from the difficulty of controlling the hydrolysis reactions satisfactorily, there will be reduced efficiency of flameproofing action.

4. Impregnation or Dyeing of a Soluble Compound + Hydrolysis

A closely related approach is to swell a fiber in a suitable bath and impregnate or dye the oxide precursor, salt or compound into the swollen polymer. It is then hydrolyzed in a second bath. The disadvantages, both in terms of properties obtainable and in terms of processing difficulties are very similar to the one just discussed.

5. Dissolving or Impregnating a Soluble Compound + Precipitation

A variant of these procedures is that of impregnating, dyeing, or dissolving a soluble compound into a spinning solution or molding solution, followed by reaction with a second bath which contains a precipitant for the compound. This procedure sometimes results in a greater permanence of the treatment, since it is sometimes possible to select mixed oxide compositions which are less water-soluble than certain single oxides. However, the problems and the results are similar to the treatments already discussed. Such procedures usually result in badly delustered fabrics which have relatively poor efficiency for flameproofing, except at high loadings. The processing is complex, and several extra process steps are required. The necessity to diffuse reactants into a film or fiber, conduct a precipitation reaction, and then to diffuse the reaction products out, results in long treatment times.

6. Use of Metal Compounds Without Conversion to Oxides

Sometimes an approach has been to dissolve or suspend a metal compound such as a metal halide, a metal tartrate, metallic esters and the like into a spinning solution, molding solution, or polymer melt, and the process the polymer without converting the metal compound into the corresponding metal oxide. Again many problems are presented. For example, if the compound is hydrolyzable, then upon contacting the finished fiber or film with water, it will be delustered.

If the compound chosen has appreciable water-solubility, even if it is not hydrolyzable, it will tend to be leached out during washing operations. Since a typical garment may undergo 50 or more washings during its useful life, it is seen that this can become a severe problem.

This approach is often inapplicable in preferred polymer processing operations because of the high temperatures they require. Thus, melt spinning of polymers can occur from temperatures as low as 175° C. to as high as 300° C., depending on the particular polymer being processed. Many compounds are simply too volatile, or too thermally unstable to withstand such process conditions. For example, the vapor pressures of metal halides such as antimony trichloride, tin tetrachloride, and titanium or zirconium tetrachlorides are quite high at these temperatures. Severe loss of the compound and contamination of the spinning equipment by the volatile vapors can occur. Metal tartrates are decomposed at high temperatures, causing blackening of the resulting fiber or film. Even when spinning is done from a solvent, drying temperatures are often high enough to create similar problems.

Some compounds such as the metal halides react with the polymer itself, and catalyze undesired reactions such as crosslinking, gel formation, or others.

Even though the compound is soluble in a suitable solvent for the polymer, it is often found to crystallize or aggregate due to poor compatibility with the polymer when the solvent is evaporated. If this occurs, it leads to delustering, and poor flame-proofing efficiency.

Finally, many compounds are not soluble in desired solvents. For example, ammonium antimonyl tartrate, barium antimonyl tartrate, and other alkali metal tartrates such as potassium, have been employed as suspensions in polyester molding syrups. However, such compounds are not soluble in solvents such as dimethylformamide, which is a preferred spinning solvent for polyacrylonitrile fibers, for example.

As a result of these difficulties, flameproofing by addition of such compounds has found only a limited or restricted application in the art.

7. Addition of Finely Divided Oxide Aggregates

Finally, the art has attempted to get around some of the problems noted above with earlier treatments, by milling or suspending finely divided aggregates of metal oxide into a spinning solution, molding solution, or polymer melt. In this way, a more active flameproofing material could be obtained by using a high surface area oxide having a higher percentage of the atoms on the surface where they could react quickly to exert their flameproofing effect. The art has used aggregates prepared as gels, as precipitated powders, and as aggregates prepared by oxidizing the corresponding metallic halides. Although improvements in efficiency were obtained by this procedure, there were still a number of problems. Even though the ultimate oxide crystals or oxide particles were small, they were present as large aggregates. If this were not the case, it would not have been possible to prepare a dry powder which could be handled, since unaggregated particles in the colloidal size range would be a smoke suspendable even in air. The above procedures, therefore, always involved a greater or lesser degree of aggregation. This, in turn, caused delustering, although not as extensive as if single particles as large as the aggregates had been employed. For certain purposes, when it is desired to only partially decrease the luster of a fiber, such materials are useful. However, when placed in a fiber or film at loadings sufficiently high to exert appreciable flameproofing activity, for example from 1 to 10 percent, which is the general range of effectiveness for flameproofing, the aggregates cause delustering. They also increase the viscosity of the spinning or molding solution unduly, since very finely divided particles in the form of aggregates adsorb large quantities of solvent in their internal structure, and this in turn may cause problems in achieving the right viscosity for spinning purposes. Aggregates of several microns to tens of microns in diameter, tend to have almost as adverse an effect on the mechanical properties of fibers and films as do unitary particles of the same size.

Finally, although there are more atoms on the surface in an aggregate than in a unitary particle of similar size, the flameproofing efficiency of an aggregate is considerably lower than that of the discrete ultimate particles of the same size as those making up the aggregate, homogeneously distributed throughout the polymer. This is because flameproofing is essentially a kinetically controlled event. Once a flame starts in a fabric or a film, temperatures increase rapidly and flameproofing additives which must first react with one another to be effective, can do so only if the diffusion distances required to achieve reaction are short. The distances between aggregates or ultimate particles are of the same order of magnitude as the size of the particles themselves at the loadings which are effective for flameproofing. For example, at a 7 volume percent loading, the distances between aggregates would be, on the average, equal to the aggregate diameter. Thus, aggregates which are several microns in size are separated from one another, and also separated from potentially coreactive components of the flameproofing treatment, by distances of several microns. Since diffusion times in solid, or even in molten polymers, are rather long for such distances, the polymer zones in between the aggregates will tend to be burned up and destroyed before sufficient time has passed for diffusion to take place.

SUMMARY OF THE INVENTION

This invention provides stable sols composed of substantially discrete (i.e. non-aggregated) colloidal particles of $Sb_2O_3$, $SnO_2$ and $TiO_2$, dispersed in polar organic liquids. The metal oxide particles have an average particle size in the range of about 2 to about 50 millimicrons. The sols are stabilized by presence of a stabilizing species such as halide, alkoxy of one to four carbon atoms, or carboxylate of one to eight carbon atoms. Preferred organic liquids are those which are solvents for commercially important polymers. Typical solvents include dimethylformamide, formamide, methyl formamide, formic acid, dimethylacetamide, methylacetamide, dimethylsulfoxide, dimethylsulfone, tetramethyl-urea, and diethylene glycol ethers.

Sols of the invention are particularly suited for incorporating the metal oxides into fibers such as polyacrylonitrile which are spun from solutions in organic liquids such as dimethylformamide, to provide fibers with increased flame resistance. Since the metal oxide particles are substantially discrete, they do not lead to increased viscosity of the spinning solution, delustering of the fiber, or plugging of spinnerettes and filter packs.

The sols of the invention can be made by a direct, economical method which involves reacting a salt of the metal with water and ammonia in a solution of the organic liquid. The reaction produces the metal oxide in colloidal dispersion and an insoluble ammonium salt, which is removed. The amount of water used is at least, but not substantially in excess of, that required to produce the oxide. The amount of ammonia used is that required to react with most, but not all, of the anion of the metal salt. Some of the anion is left in the sol to stabilize it.

For example, $SbCl_3$ is dissolved in dimethylformamide and is reacted with water and ammonia gas. This reaction produces $Sb_2O_3$ in colloidal dispersion and ammonium chloride. The ammonium chloride, which is insoluble in dimethylformamide, precipitates, and is filtered off. The remaining sol is stabilized by residual chloride ion.

The residual chloride (or other anion of the metal salt) can subsequently be exchanged for another stabilizing anion, if desired, by addition of an acid of the new anion, plus sufficient ammonia to remove the original anion as its insoluble ammonium salt. Typical exchange anions include formate, acetate, hydroxyacetate, salicylate and phthalate. Alternatively, the surfaces of the metal oxide particles can be esterified by reaction with a primary or secondary alcohol containing one through four carbon atoms and the residual chloride removed by reaction with ammonia, to provide a sol stabilized by alkoxy species.

The invention also includes flame resistant, synthetic organic polymeric materials, and flame-resistant shaped articles such as fibers, films, and foams, of such materials, which contain between about ½ percent and 20% by weight, based on polymer weight, of at least one metal oxide selected from $SnO_2$ and $TiO_2$, in the form of particles with an average size in the range of about 2 to about 50 millimicrons. The oxide particles are homogeneously dispersed and embedded in a matrix of the polymer.

DETAILS OF THE INVENTION

Products

The metal oxide particles in the sols of the invention have average diameters of from about 2 to about 50 millimicrons, preferably from 5 to 30 millimicrons. Colloidal particles smaller in diameter than about 2 millimicrons tend to disproportionate into volatile oxyhalide species and thus can be lost in processing, while particles larger than about 50 millimicrons show an undesirable degree of light scattering when incorporated into polymeric fibers. The sols of the invention are essentially colorless. When mixed with polymers they provide completely clear, colorless solutions which are convertible on drying into equally clear films, fibers, foams and molded bodies. That the particles are substantially discrete can readily be observed in electron micrographs. Further, the sols have a viscosity no greater than 3 times that theoretically calculable for discrete, spherical colloidal particles for the volume fraction of oxide present using the Mooney equation. M. Mooney, J. Colloidal Science, Vol. 6, pp. 162–170, (1952).

The sols contain a stabilizing quantity of species selected from the group consisting of halide (especially chloride and bromide), alkoxide of one through four carbon atoms, and carboxylate of one through eight carbon atoms. Certain anions such as halide anion are not preferred, at least if present in large quantity, because of the danger of stress-corrosion cracking of stainless steel equipment, and because of disproportionation to produce soluble oxyhalide species at elevated temperatures, which can provide a mechanism for excessive particle growth. Thus, if halide salts are used in the preparation, it is preferred to replace the halide with an alkoxy radical RO— where R is a primary or secondary alkyl group of one to four carbon atoms, or with a carboxylate radical $R_1COO$— where $R_1$ is hydrogen, alkyl of one to four carbon atoms, hydroxyalkyl of one to four carbon atoms, phenyl, tolyl, carboxy phenyl or hydroxyphenyl. The most preferred carboxylate radicals are the radicals of relatively non-ionized complexing acids such as alpha hydroxy carboxylic acids or other acids capable of forming stable chelate rings with the metal oxides. Examples of such acids include hydroxy-acetic acid, salicylic acid, and o-phthalic acid.

In use, the sols of the invention are mixed with solutions of polymers which are soluble in the polar organic solvents of the invention such as polyacrylonitrile, copolymers of acrylonitrile with vinyl and vinylidene halides, polyamides, polyesters, polyurethanes, polyacrylates, polyvinyl chloride and acrylonitrile-butadiene-styrene copolymers. After the sol is mixed with the polymer solution, the polymer can be processed in a conventional manner to make shaped articles. Thus, the solution can be used directly for solution spinning of fibers, casting of films or preparation of foams. Alternatively the solvent can be removed and the polymer containing the colloidal oxide can be melt extruded to form rods, pellets, fibers or films or molded to form other articles. Many of these polymers, e.g., polyamides, polyesters, and polyacrylonitrile are negatively charged. The $TiO_2$ sols of the invention are composed of negatively charged particles, and thus do not tend to flocculate the negatively charged polymers. The $Sb_2O_3$ and $SnO_2$ particles, however, are positively charged in the presence of strongly ionized acids such as hydrogen chloride and hydrogen bromide. Thus, it is particularly preferred in the case of the $Sb_2O_3$ and $SnO_2$ sols that the stabilizing species be an alkoxy radical, i.e., that the surface of the particles be neutralized by esterification with a primary or secondary alcohol of one to four carbon atoms. The neutral particles are compatible with negatively charged polymers. $Sb_2O_3$ and $SnO_2$ sols stabilized with relatively non-ionized chelating acids as described above are also essentially neutral, and compatible with negative polymer solutions.

The amount of stabilizing species required is dependent upon the surface area of the metal oxide particles. In general, the amount required is in the range of 2.5 to 50 anions per square millimicron of metal oxide surface area, as determined by nitrogen adsorption. In no case, however, should the amount of stabilizing species be greater than 50 percent of the stoichiometric amount which would be present in the corresponding metal halide, alkoxide, or carboxylate.

Concentration of sols of the invention is from about 1 to 30 percent by weight, preferably about 2 to 15 percent by weight, calculated as the metal oxide content. The 2 to 15 percent range is preferred when the sols are to be used as flameproofing agents for organic films and fibers, while concentrations in the range of 10 to 25 percent are preferred for incorporating the sols into molded articles.

The sols of the invention are essentially discrete, and thus do not lead to increased viscosity, delustering of the fiber, or plugging of the spinnerettes and of the filter packs employed in preparing fibers.

The preferred sols are also thermally stable against excessive particle growth or aggregation upon exposure to elevated temperatures. Processing of organic fibers usually involves a high temperature processing step during spinning or drawing. For example, in the case of polyacrylonitrile, one procedure involves exposure to a temperature of 140°C. during the spinning operation. Temperatures are even higher for spinning melt-spun fibers such as polyamides and polyesters. Melt spinning of nylon type polyamide fibers is ordinarily accomplished at temperatures in the range of 200°-250° C., while melt spinning of polyesters is normally performed at temperatures between 250° and 300° C.

The sols have high efficiency as flame retardant additives, particularly when the organic polymer into which they are incorporated contains a source of organic halogen. For example, suitable organic halogens can be furnished either from a halide-containing copolymer such as vinyl chloride, vinylidene chloride or vinyl bromide copolymerized with acrylonitrile, or as an additive such as a halide-containing hydrocarbon of appreciable molecular weight which is essentially nonvolatile. Examples of such additives are polyvinyl chloride, chlorinated or brominated terpenes, chlorinated or brominated waxes, and the like.

Process

Metal oxide sols of the invention are prepared by reaction of water and ammonia with a salt of the metal dissolved in a polar organic liquid. The amount of water should be at least equal to the stoichiometric amount required to convert the metal salt to the corresponding metal oxide, but not substantially in excess of the amount required to convert to the metal hydroxide. It is preferred that the final sol contain less than 1 percent by weight of free water.

The metal salt is dissolved in the organic liquid, water is added, and ammonia is introduced as a gas or as a solution in a solvent. The reaction produces an ammonium salt with the anion of the metal salt, and it also produces the hydrous metal oxide in colloidal dispersion. The ammonium salt is insoluble in the organic solvent; it precipitates, and is filtered off.

Addition of ammonia is continued until the desired amount of anion is removed by formation of the ammonium salt and precipitation. Usually it is desired to remove between about 50 and 90 percent of the anion, preferably between about 65 and 80 percent. A portion of the anion must be left in the sol to stabilize the charged colloidal oxide particles against gelling. The amount of stabilizing anion required varies with particle size. In general, the smaller the particle size, the greater proportion of anion required. It is believed that the function of this anion is to impart an electrostatic charge to the surface atoms of the metal oxide particles, which otherwise would have a tendency to join in flame resistance, while amounts in excess of 20 percent are usually not required, even with polymers most susceptible to burning. Generally, polymers which have a halogen attached to the polymer chain, or which contain an organic halogen-containing additive such as polyvinyl chloride, tetrabromophthalic anhydride, chlorinated or brominated waxes and terpenes, respond most favorably to the metal oxides of the invention, presumably because of the formation of volatile metal halides and oxyhalides which interfere with flame propagation by trapping free radicals. For this reason, smaller amounts of the metal oxides are required when used in conjunction with organic halogens, and highly flame resistant polymers can be prepared having only a few percent of metal oxide particles of the invention.

The most preferred range for metal oxide content is about 1–10 percent by weight based on the weight of the polymer in compositions containing organic halogen, and about 5–19 percent (same basis) in compositions containing no organic halogen.

Advantages of Compositions of the Invention

In contrast to most prior art treatments which cause severe delustering, the compositions of this invention may be incorporated in films or fibers to give substantially no delustering.

As a result of the high surface area of the particles of this invention and the large number of surface atoms, coupled with the uniform distribution achieved, the particles are highly efficient as flameproofing agents and are much more efficient than either the coarse particles of the prior art, or the aggregated finely divided particles of the prior art.

Since the particles of this invention are dispersed in good solvents for organic polymers, they can be mixed with the polymers and spun or cast and dried to give oxide particles completely surrounded by the organic polymer. Thus the compositions of the invention generally have excellent permanence as flameproofing treatments, in contrast to many of the treatments of the prior art.

Since the oxides of this invention are selected from a class which are both thermally stable and high melting, adverse reactions such as volatilization and thermal decomposition such as have often occurred with compounds of the prior art, do not occur.

Due to their small size and uniform distribution, the particles of this invention do not adversely influence polymer mechanical properties and either maintain or even improve tensile strength and modulus.

The aesthetics also are not adversely affected, in that the "hand," the drapability, and other properties of a subtle but important nature in fabrics are little changed from those of the polymer itself.

The following examples illustrate the preparation and characteristics of the compositions of this invention. In the examples, flame resistance is determined by the standard limiting oxygen index (LOI) analysis. In this test procedure a sample of fabric or film is ignited from the top in a chamber containing a controlled proportion of oxygen, and the percent oxygen required to just continue flame propagation is measured. The higher the percentage oxygen observed, the more flame resistant is the polymer.

EXAMPLE 1

One mole of anhydrous antimony trichloride is dissolved in 1000 grams of dimethylformamide and 18 grams of water are added. A solution of 2.5 mole ammonium hydroxide in DMF (dimethyl formamide) is prepared by bubbling ammonia through a chilled DMF solution. This solution is added to the antimony trichloride-water-DMF solution until the pH reaches 6.0. The temperature is maintained at about 15° C. during the addition. The product is filtered to remove precipitated ammonium chloride, and the clear dispersion in dimethylformamide is analyzed for percent chloride, percent antimony, and percent $H_2O$. The product is found to contain 4.80 percent antimony, 1.03 percent chloride, and 1.06 percent water. Electron micrographs are obtained, and the product is shown to consist of a dispersion of discrete, spherical colloidal particles of antimony trioxide, approximately 3 millimicrons in diameter. The ratio of moles of chloride anion as a stabilizing agent to the moles of surface antimony groups are therefore 0.79. This is based on an estimated population density of approximately 5 antimony surface groups per square millimicron of surface.

The dimethylformamide is evaporated from a portion of this dispersion, under vacuum, to leave a dried, solid product. This is analyzed by X-ray diffraction and shown to consist of crystalline cubic antimony trioxide.

A portion of the dispersion is mixed with 4 moles of ethyl alcohol per mole of antimony present and heated at 60° C. for one hour. Ammonia gas is then bubbled in, maintaining the temperature at 60° C. to remove the major portion of the remaining chloride as insoluble ammonium chloride. The product is filtered and distilled under vacuum at 30° C. to remove the excess alcohol. The product is a stable dispersion of surface-esterified colloidal antimony oxide particles in DMF. Polyacrylonitrile is dissolved in a portion of the dispersion and a 20 percent vinylidene chloride/80 percent acrylonitrile copolymer is dissolved in another portion by stirring the polymer into the dispersion at 110° C. In each case, clear solutions containing 30 percent by weight polymer are obtained. Films prepared from these solutions are lustrous and clear, indicating no flocculation between the negatively charged polymer molecules and the neutrally charged antimony oxide surface-esterified colloid. The films are flame resistant, as shown by increases in LOI as compared to control samples containing no antimony oxide.

This product is found to retain approximately one mole of ethyl alcohol per mole of surface antimony groups in the form of a surface ester.

EXAMPLE 2

Three hundred forty-six grams of anhydrous stannic chloride are mixed into 800 grams of dimethylformamide and 47.8 grams of water, and the mixture heated to 100° C. and held for ½ hour. This is cooled to 15° C. in an ice bath, and gaseous ammonia is bubbled into the solution until the initial pH of 2.4 is increased to 4.01. The time of addition is 14 minutes. At this point, the solution is filtered and ammonia gas is passed in over an additional 15 minute period, until the pH is 6.0. The precipitated ammonium chloride is again filtered and with one another, causing particle growth, agglomeration and flocculation. However, the exact nature of the stabilization mechanism is not known with certainty.

If the essentially complete removal of the anion of the metal salt precursor is desired, an acid may be added which will provide a suitable stabilizing anion other than the initial one. Care must be exercised, of course, to ensure that the ammonium salt of the added anion is more soluble than the ammonium salt of the original anion, in order to effect the exchange of the anions in this fashion.

An alternate process is to react the sol in the organic solvent with an anion exchange resin containing the anion with which it is desired to replace the original anion. The original anion is then taken up on the anion exchange resin, which can be removed from solution by filtration or other suitable physical methods.

If it is desired to obtain an anion-free composition, this may be done by reacting the unsatisfied valences of surface atoms with an organic alcohol to prepare a surface ester. The acid formed between the proton of the alcohol and the anion of the metal salt may be removed by precipitation with additional ammonia as the insoluble ammonium salt, or by anion exchange with an anion exchange resin. Lower chain aliphatic alcohols having less than five carbon atoms such as methanol, ethanol, propanol, isopropanol, and butanol are preferred alcohols for esterification. Primary and secondary alcohols are preferred over tertiary ones.

The metal salt precursor must be soluble in the polar organic liquid, and it must have an anion which will form an ammonium salt that is substantially insoluble in the same liquid. The liquid must, of course, be nonreactive other than forming solvates with the metal salt precursors of the oxide, and must be a good solvent for synthetic organic polymers used for films and fibers. It must also be sufficiently polar to allow the counter anions to stabilize the charged sol particles.

Metal bromides and metal chlorides, especially the chlorides, are the preferred starting metal salts. Preferred liquids include dimethylformamide, formamide, methylformamide, acetamide, methylacetamide, dimethylacetamide, dimethylsulfoxide, dimethylsulfate, dimethylurea, N-methyl-2-pyrrolidone, anhydrous formic acid, and the diethylene glycol ethers. Particularly preferred are the liquids most commonly used in solution spinning of polyacrylonitrile fibers, viz., dimethylformamide, dimethylacetamide, and dimethylsulfoxide.

Certain of these solvents such as DMSO are sufficiently good solvents for the ammonium salt of the metal anions to retain too much of the salt dissolved in the final product. In such cases, the reaction may be performed in a solvent such as dimethylformamide, which shows a very low solubility for such ammonium salts, and the product transferred by distillation into one of the other solvents, if its boiling point is higher than that of dimethylformamide. For those solvents which have lower boiling points than dimethylformamide, the colloidal dispersion can be evaporated at a low temperature (25° C. to 60° C.) under vacuum to a solid condition, and this can be dissolved or repeptized in the lower boiling solvent into which it is desired to transfer it.

The precipitation reaction with $NH_3$ is carried out in the liquid solvent, preferably at a temperature in the range of 0° C. and 100° C. Since the reaction is exothermic, it may be necessary to apply cooling, or conduct the reaction under reflux conditions. As noted above, some of the ammonium salt may be soluble to varying degrees in the solvent, and cooling may be necessary to complete the removal of the anion as the ammonium salt. The use of higher temperatures may sometimes be necessary to grow the particles and avoid gel formation, which prevents effective dispersion of ammonia. However, excessive heating must be avoided because the particles can also grow so large that they precipitate.

The solids concentration is preferably maintained between about 1 and 10 percent during the reaction. The sols may subsequently be concentrated up to about 30 percent or greater by evaporation of the solvent, preferably by vacuum distillation.

In the case of stannic chloride, the reaction may be expressed by the following equation, where 75 percent of the chloride ion initially present is precipitated as ammonium chloride.

$$SnCl_4 + 1.5\ H_2O + 3\ NH_3 \rightarrow SnO_{1.5}Cl + 3\ NH_4Cl$$

In this case, the tin oxide particles carry a positive charge and are stabilized by the negatively charged chloride counter ions.

For purposes of mixing with negatively charged polymer solutions such as acrylonitrile in dimethylformamide, it is desired that the colloidal metal oxide not have a charge opposite that of the negatively charged polymer. This causes flocculation of the polymer with the oxide, resulting in delustering and lowered effectiveness of the oxide as a flameproofing material. This can be avoided by a reaction of esterification with a suitable alcohol such as ethanol, as shown below:

$$SnO_{1.5}Cl + C_2H_5OH + NH_3 \rightarrow SnO_{1.5} \cdot OC_2H_5 + NH_4Cl$$

The resulting surface-esterified colloidal stannic oxide sol now no longer has a positive charge and is compatible with negatively charged polymers such as those discussed above.

Titanium oxide, being more strongly acidic, tends to ionize at its surface metal-OH groups to furnish a proton and give a negatively charged colloidal particle. Thus, titania sols are already negatively charged, and it is not necessary to esterify the particle surfaces to reverse the charge and confer compatibility with negatively charged polymers.

For making flame resistant polymers and polymeric articles, a sol of the invention is mixed with a solution of the polymer in the same or a compatible liquid, then most of the liquid is vaporized. In making shaped articles, the liquid can be vaporized either before shaping the article, as in manufacture of film and fibers by melt extrusion, or after shaping the article, as in casting of films and solution spinning of fibers.

The amount of metal oxide which should be incorporated into polymers to provide effective flame resistance varies somewhat with the nature of the polymer and the degree of flame resistance required, but will generally range between 0.5 and 20 percent by weight of the polymer. Loadings below 0.5 percent are often insufficient to achieve substantial improvements original sol in dimethylformamide. This is repeated in dimethylacetamide, and again 10 grams of the dry antimony oxide concentrate disperses to give a clear, colorless sol which has essentially unchanged particle size and degree of dispersion in the dimethylacetamide solvent relative to its original state of dispersion and particle size as prepared in dimethylformamide.

EXAMPLE 6

The titanium dioxide sol of Example 4 is evaporated to dryness by evacuation in a vacuum desiccator at room temperature for one week to give a dry, colorless concentrate. Ten percent dispersions of this are prepared in dimethyl-sulfoxide and dimethylacetamide by stirring at 25° C. Electron micrographs of the product show that it has not changed in particle size or degree of dispersion in the new solvents relative to the particle size and degree of dispersion in the original dimethylformamide synthesis solvent.

EXAMPLE 7

The stannic oxide sol of Example 2 is evaporated to dryness in a vacuum desiccator attached to a high speed vacuum pump for a week at room temperature, and a dry solid material is obtained. This material disperses at 25° C. in dimethylsulfoxide, while stirring, to give a 10 percent sol of stannic oxide in dimethylsulfoxide. The particle size distribution and particle size, as well as the degree of dispersion, is unchanged relative to that of the original sol in dimethylformamide.

EXAMPLE 8

To 120 grams of dimethylacetamide are added 22.6 grams, or one-tenth mole of anhydrous antimony trichloride, and 3.6 grams of water. The pH at this point is 2.1. Ammonia gas is bubbled into this solution until the pH is increased to 3.7 and the precipitated ammonium chloride is filtered off to give a clear filtrate. Chemical analysis shows the remaining product to contain 7.30 percent antimony oxide, and 4.6 percent chloride; it also contains 0.5 percent water. Upon examination by X-ray diffraction and electron micrograph, the product is shown to consist of approximately 3 millimicron particle diameter discrete, colloidal, spherical particles of cubic antimony oxide. The product is thus quite similar to that of Example 1, with the exception of its synthesis in a dimethylacetamide solvent rather than a dimethylformamide solvent.

EXAMPLE 9

Three parts of a colloidal dispersion of antimony oxide in dimethylformamide prepared as in Example 1 and containing 4.80 percent antimony by analysis is added to 1.5 parts of polyvinyl chloride dissolved in ten parts of hot dimethylformamide. The clear solution is poured onto a pyrex plate and dried in a circulating oven for 30 minutes at 120° C., to give a clear, lustrous film. The film exhibits enhanced flame resistance by LOI analysis as compared to a film of the same polymer containing no antimony oxide. A film similarly prepared from a dispersion of 0.15 parts of a commercial antimony oxide powder (B&A reagent grade), in a solution of 1.5 parts of polyvinyl chloride dissolved in 10 parts of dimethylformamide is delustered, and is inferior in the LOI test to a film prepared from the colloidal antimony oxide dispersion, although the antimony content of the film is similar.

Three parts of a colloidal antimony oxide dispersion in dimethylformamide prepared as described above, is added to 1.5 parts of methyl methacrylate and 0.2 parts of powdered Chlorowax 70 (a chlorinated hydrocarbon wax supplied by the Diamond Chemical Company) dissolved in 10 parts of dimethylformamide. A clear lustrous film prepared as described above exhibits enhanced flame resistance in the LOI test. A film containing a similar amount of antimony prepared from a dispersion of commercial antimony oxide powder as described above is delustered and shows inferior flame resistance in the LOI test as compared to the film containing the colloidal antimony oxide, although the antimony content of the film is similar.

Three parts of a colloidal antimony oxide dispersion in dimethylformamide prepared as described above is added to 1.5 parts of a polyurethane (Helastic LS-13160, supplied by the Wilmington Chemical Corp.) and 0.2 parts of powdered Chlorowax 70 dissolved in 10 parts of dimethylformamide. A clear, lustrous film prepared as described above exhibits enhanced flame resistance in the LOI test as compared to a film of the same polymer containing no antimony oxide.

We claim:

1. A stable sol of substantially discrete colloidal particles of a metal oxide selected from the group consisting of antimony (III) oxide, stannic oxide, and titanium dioxide, dispersed in a polar organic liquid, in an amount of 1 to 30 weight percent metal oxide, the particles having an average particle diameter of between about 2 and about 50 millimicrons, said sol containing a stabilizing quantity of at least one anionic species selected from the group consisting of halide, alkoxy of one through four carbon atoms, and carboxylate of one through eight carbon atoms, said stabilizing quantity being in the range of 2.5 to 50 anions per square millimicron of metal oxide surface area.

2. A sol of claim 1 wherein the stabilizing species is a member of the group consisting of the anions of formic acid, acetic acid, hydroxyacetic acid, salicylic acid, and o-phthalic acid.

3. A sol of claim 1 wherein the stabilizing species is selected from the group consisting of methoxy, ethoxy, n-propoxy, i-propoxy, n-butoxy, s-butoxy, and i-butoxy.

4. A sol of claim 1, in which the liquid is selected from the group of anhydrous formic acid, formamide, methylformamide, dimethylformamide, acetamide, methylacetamide, dimethylacetamide, dimethylsulfoxide, dimethylsulfone, dimethylurea, N-methyl-2-pyrrolidone, and the diethylene glycol ethers.

5. A sol of claim 2, in which the liquid is selected from the group of anhydrous formic acid, formamide, methylformamide, dimethylformamide, acetamide, methylacetamide, dimethylacetamide, dimethylsulfoxide, dimethylsulfone, dimethylurea, N-methyl-2-pyrrolidone, and the diethylene glycol ethers.

6. A sol of claim 3, in which the liquid is selected from the group of anhydrous formic acid, formamide, methylformamide, dimethylformamide, acetamide, methylacetamide, dimethylacetamide, dimethylsulfoxwashed and the filtrate heated to 100° C. and held at this temperature for ½ hour. At this point the pH has dropped to 5.6, and ammonia gas is passed in until the pH increases to 6.5. The ammonium chloride is again filtered, and the solution analyzed for percent tin, percent chloride, and percent water. The percent tin is 10.75, chloride 5.0 percent, water, 0.95 percent. The product is examined in an electron microscope and found to consist of a dispersion of discrete, spherical colloidal particles of amorphous stannic oxide having an average particle diameter of 5 millimicrons. The molar ratio of chloride stabilizing anions to surface tin groups, based on an estimated population of 5 tin atoms per square millimicron of tin surface, is calculated to be 7.15.

This is a water-clear, stable sol of colloidal particles. When mixed with polyacrylonitrile polymer, it makes a solution with a slight indication of coagulation of the positively charged stannic oxide sol with the negatively charged acrylonitrile polymer of loadings of $SnO_2$ above about 2.5 percent by weight based on polymer. The coagulation is only slight, however, as shown by the fact that this material can be cast to form only slightly delustered films, and spun with no difficulty, to prepare fibers. The stannic oxide alone substantially increases the flame resistance of polyacrylonitrile, as shown by the value of the limiting oxygen index. At a ten percent stannic oxide loading in polyacrylonitrile, it is found that the LOI for a knit fabric increases from a value of 0.18 for the unmodified fiber, to 0.24 for the sample containing the stannic oxide. When a polyacrylonitrile containing 15 percent vinyl chloride as a copolymer is substituted for the polyacrylonitrile fiber, using identical processing procedures, and still at a loading of 10 percent stannic oxide in the fiber, it is found that the LOI increases from 0.21 for the unmodified copolymer fiber, to 0.30 for the stannic oxide-containing fiber. This fabric is only slightly delustered over unmodified controls containing no stannic oxide.

EXAMPLE 3

Three hundred forty-six grams of anhydrous stannic chloride are mixed with 48 grams of water and 800 grams of dimethylformamide which has previously been chilled in ice to 5° C. The stannic chloride is added to the mixture first, followed by the water, and the temperature is not allowed to exceed 60° C. The mixture is then heated to 80° C. for one-half hour, and ammonia gas is passed in until the starting pH of 2.7 has increased to 4.0. The time of addition of the ammonia is 15 minutes, and the temperature is maintained below 30° C. during the addition. Ninety-four grams of ammonium chloride precipitate are recovered by filtration and ammonia is then passed through the filtrate until the pH reaches 5.5. This addition of ammonia occurs over a time of 30 minutes, while maintaining the temperature below 30° C. This is filtered, and 87 grams of ammonium chloride are recovered. Following each filtration, the ammonium chloride is washed with DMF and the washings added to the filtrate, so that the final product obtained weighs 1340 grams. Four hundred sixty grams of ethyl alcohol are added to this, and the mixture heated to 73° C. and ammonia is passed into the solution over a period of 50 minutes while the pH goes from 4.6 to 6.0, and the temperature is maintained between 72° and 75° C. This is chilled to 25° C. and the ammonium chloride resulting is centrifuged out of solution by spinning for 15 minutes at 2000 rpm. The ammonium chloride cake from the centrifugation is washed with approximately a liter of DMF, and this wash filtered and added to the product. Approximately 71 grams of ammonium chloride are recovered at this stage. The product is then distilled to eliminate water and excess ethyl alcohol, and the product analyzed. It is found to contain 6.6 percent tin, 1.6 percent chloride, and 0.2 water. This material is completely compatible with polyacrylonitrile and with a 20 percent vinylidene chloride/80 percent acrylonitrile copolymer to give lustrous, clear films. Electron micrographs, X-ray diffraction and chemical analyses indicate that the product is amorphous stannic oxide, of about 3 millimicrons particle diameter, which contains 1 mole of esterified ethoxy groups per mole of surface stannic oxide. It also still contains 2.3 chloride anions per mole of surface tin atoms.

EXAMPLE 4

Two hundred eighty grams of anhydrous titanium tetrachloride are weighed into 1000 grams of DMF and added to 72 grams of water dissolved in 700 grams of DMF. The mixture is cooled to 30° C. and the initial pH of 0.2 is increased to 3.0 over a time of one hour and 11 minutes, by feeding in ammonia gas while maintaining the temperature within the range of from 30° to 40° C. The ammonium chloride is filtered off and the product, a clear dispersion in dimethylformamide, analyzed. It is found to contain 4.85 percent titanium, 3.97 percent chloride, and 2.11 percent water. Electron micrographs show the average particle diameter to be about 5 millimicrons and an X-ray diffraction pattern of the dry material obtained by evaporating under vacuum at 30° C. indicates it to be amorphous. The ratio of stabilizing chloride anion to surface titanium atoms is found to be 5.2, based on an estimated population density of 5 titanium atoms per square millimicron of titania surface.

This product is mixed with polyacrylonitrile, and with an acrylonitrile copolymer with vinylidene chloride, with the polymer being dissolved in a DMF solution containing the titania colloid, at a loading of 10 percent of $TiO_2$ based on the weight of polyacrylonitrile or modified polyacrylonitrile. This material is spun into fibers and cast as films and gives water-clear, completely lustrous films and fibers. In spite of the fact that titania is normally thought to be a delustering agent, these fibers containing 10 percent titania are lustrous.

EXAMPLE 5

The clear DMF colloidal sol of antimony oxide prepared as described in Example 1 (prior to esterification) is evaporated to dryness in a vacuum desiccator at room temperature for a one week period, with essentially quantitative recovery of the antimony oxide. Ten grams of this are mixed with 100 grams of dimethylsulfoxide and stirred at 25° C. The solid antimony oxide disperses immediately to give a clear, colorless sol of antimony oxide in dimethylsulfoxide. Electron micrographs show that the particle size and degree of dispersion are essentially unchanged compared with the ide, dimethylsulfone, dimethylurea, N-methyl-2-pyrrolidone, and the diethylene glycol ethers.

7. A sol of claim 2 wherein the liquid is selected from the group consisting of dimethylformamide and dimethylacetamide.

8. A sol of claim 3 wherein the liquid is selected from the group consisting of dimethylformamide and dimethylacetamide.

9. A sol of claim 1 wherein the metal oxide particles have an average diameter in the range of 5 to 30 millimicrons.

* * * * *